(12) United States Patent
Couillard et al.

(10) Patent No.: US 12,508,798 B2
(45) Date of Patent: Dec. 30, 2025

(54) LAMINATED PANES AND WINDOWS FORMED THEREWITH

(71) Applicant: CORNING INCORPORATED, Corning, NY (US)

(72) Inventors: James Gregory Couillard, Ithaca, NY (US); Michael Aaron McDonald, Painted Post, NY (US); Paul George Rickerl, Endicott, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/296,370

(22) PCT Filed: Nov. 26, 2019

(86) PCT No.: PCT/US2019/063316
§ 371 (c)(1),
(2) Date: May 24, 2021

(87) PCT Pub. No.: WO2020/112820
PCT Pub. Date: Jun. 4, 2020

(65) Prior Publication Data
US 2022/0016871 A1    Jan. 20, 2022

Related U.S. Application Data

(60) Provisional application No. 62/772,733, filed on Nov. 29, 2018.

(51) Int. Cl.
*B32B 17/10*    (2006.01)

(52) U.S. Cl.
CPC ........ *B32B 17/10036* (2013.01); *B32B 17/10* (2013.01); *B32B 17/10045* (2013.01);
(Continued)

(58) Field of Classification Search
CPC . B32B 17/10; B32B 17/101; B32B 17/10119; B32B 17/10761;
(Continued)

(56) References Cited

U.S. PATENT DOCUMENTS 4,113,904 A  *  9/1978  Kiefer ................. E06B 5/165
                                                  428/920
5,227,241 A     7/1993  Chaussade et al.
(Continued)

FOREIGN PATENT DOCUMENTS

CN    105358320 A    2/2016
CN    107107563 A    8/2017
(Continued)

OTHER PUBLICATIONS

Corning(R) Eagle XG(R) Glass product information sheet. Obtained from Corning.com on Apr. 5, 2023. (Year: 2021).*
(Continued)

*Primary Examiner* — Megha M Gaitonde

(57) ABSTRACT

A laminated pane for a window includes (1) a first sheet having a first thickness and a first coefficient of thermal expansion (CTE), (2) a second sheet of an inorganic glass having a second thickness and a second CTE, and (3) a polymer interlayer adhered between the first sheet and the second sheet including a layer of a first polymer material having a first elastic modulus and a layer of a second polymer material having a second elastic modulus, wherein the first CTE is greater than the second CTE, the second thickness is in the range of from 1 down to 0.3 mm, and the first elastic modulus is more than 20 times the second elastic modulus.

16 Claims, 2 Drawing Sheets

(52) U.S. Cl.
CPC ...... *B32B 17/10055* (2013.01); *B32B 17/101* (2013.01); *B32B 17/10119* (2013.01); *B32B 17/10761* (2013.01); *B32B 2307/54* (2013.01); *B32B 2307/732* (2013.01)

(58) Field of Classification Search
CPC ........ B32B 17/10005; B32B 17/10018; B32B 2307/54; B32B 2307/732
See application file for complete search history.

(56) References Cited

U.S. PATENT DOCUMENTS

| | | | |
|---|---|---|---|
| 7,297,407 | B2 | 11/2007 | Anderson |
| 7,510,771 | B2 | 3/2009 | Lu |
| 2008/0268270 | A1 | 10/2008 | Chen et al. |
| 2010/0258183 | A1 | 10/2010 | Nattermann et al. |
| 2015/0111016 | A1* | 4/2015 | Fisher ............... B32B 17/10752 428/215 |
| 2015/0258750 | A1 | 9/2015 | Kang et al. |
| 2016/0193812 | A1* | 7/2016 | Couillard ................ B32B 7/027 156/60 |
| 2017/0182739 | A1 | 6/2017 | Couillard et al. |
| 2017/0355176 | A1* | 12/2017 | Fischer ............. B32B 17/10018 |
| 2021/0221100 | A1 | 7/2021 | Joshi et al. |

FOREIGN PATENT DOCUMENTS

| | | | | |
|---|---|---|---|---|
| CN | 108602322 | A | 9/2018 | |
| EP | 3242800 | B1 * | 3/2020 | ....... B32B 17/10761 |
| TW | 201742750 | A | 12/2017 | |
| WO | 2013/181484 | A1 | 12/2013 | |
| WO | 2014/035942 | A1 | 3/2014 | |
| WO | WO-2016081422 | A1 * | 5/2016 | ........... B32B 17/064 |
| WO | 2017/192519 | A1 | 11/2017 | |
| WO | 2018/044082 | A1 | 3/2018 | |

OTHER PUBLICATIONS

International Search Report and Written Opinion of the International Searching Authority; PCT/US2019/063316; dated Mar. 11, 2020; 11 pages; European Patent Office.
Taiwanese Patent Application No. 108143658, Office Action, dated Jul. 12, 2023, 1 page; Taiwanese Patent Office.

* cited by examiner

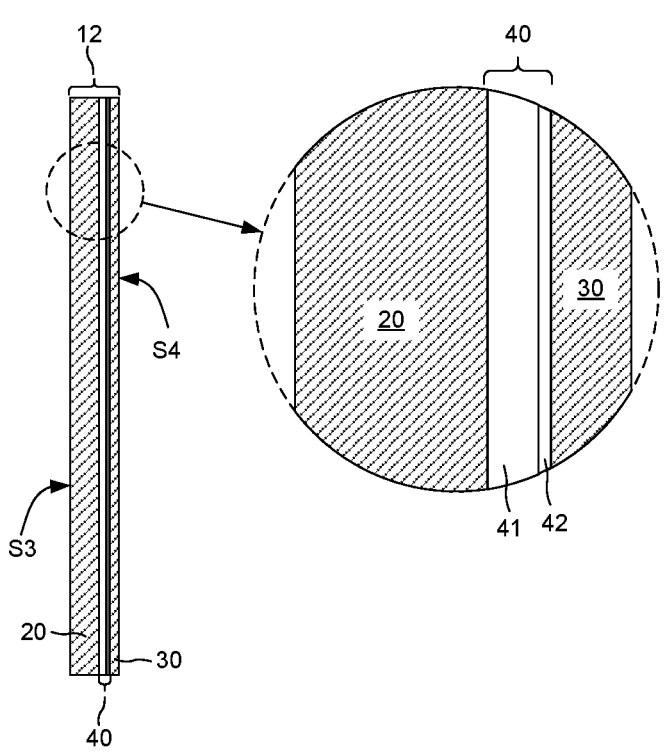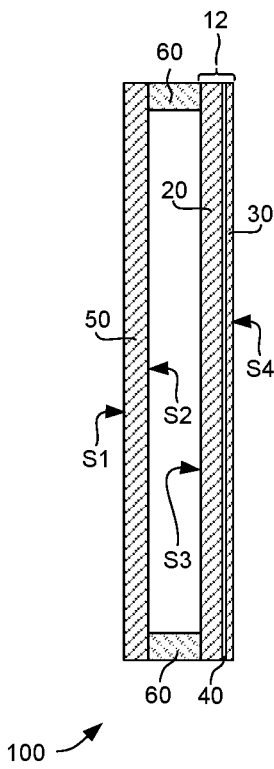
FIG. 1                    FIG. 2

LAMINATED PANES AND WINDOWS FORMED THEREWITH

CROSS-REFERENCE TO RELATED APPLICATIONS

This application claims the benefit of priority under 35 U.S.C. § 371 of International Application No. PCT/US2019/063316, filed on Nov. 26, 2019, which claims the benefit of priority under 35 U.S.C. § 119 of U.S. Provisional Application No. 62/772,733, filed Nov. 29, 2018, the content of each of which is incorporated herein by reference in its entirety.

FIELD OF THE DISCLOSURE

The disclosure relates generally to laminated panes having at least one thin glass layer and a polymer interlayer, wherein the interlayer includes at least two different polymers having widely differing elastic moduli. The disclosure also generally relates to windows employing one or more described laminated panes, such as for increased security or particularly for combined impact and pressure cycling resistance (e.g., for the use in hurricane windows).

BACKGROUND

So-called hurricane windows typically employ reinforced frame and spacer components as well as an inner laminated pane comprising two sheets of glass and a polymer interlayer having a high elastic modulus (or a high elastic modulus under sufficiently fast deformation). FIG. 5 (Prior Art) shows an example of such a window 200, intended as a hurricane window (or an IGU (insulated glass unit) 200 for such a window).

As seen in FIG. 5, the window 200 includes an outer pane 10 and an inner laminated pane 12. The outer pane 10 is typically in the form of a single sheet 50 of glass, surfaces of the sheet 50 correspond to an outer or first surface S1 and a second surface S2 (interior) of the window 200. The laminated pane 12 comprises a first sheet 20 of glass and a second sheet 70 of glass with a polymer interlayer 40 adhered between the first sheet 20 and the second sheet 70. The polymer interlayer has a high elastic modulus (or a high elastic modulus under sufficiently fast deformation), such as, for example, within the range of about 300 to 1000 MPa, or alternatively about 400 to 600 MPa when measured at an elongation rate of 10 mm per minute at 30° C. The polymer interlayer has a high elastic modulus (or a high elastic modulus under sufficiently fast deformation), such as, for example, within the range of about 1 to about 300 MPa, or alternatively about 2 to about 100 MPa when measured at an elongation rate of 10 mm per minute at 30° C. An innerfacing surface of first sheet 20 and an outer facing surface of second sheet 70 correspond to a third surface S3 (interior) and an inner or fourth surface S4 (dwelling-facing) of the window 200. Reinforced spacers 60 and a reinforced frame (not shown) are also employed.

During a hurricane, if a wind-driven projectile strikes surface S1 with sufficient force, then sheet 50, first sheet 20, and second sheet 70 can all be broken by the impact, but if the window 200 operates as intended, the polymer interlayer 40 remains intact and remains sealed within the window frame, preventing wind and wind-borne water from passing through the window 200 and entering the dwelling even after sheet 50, first sheet 20, and second sheet 70 are broken. To enable the polymer interlayer 40 to survive such an impact, the first sheet 20 and the second sheet 70 of the laminated pane 12 are heat strengthened, meaning they are thermally tempered to produce a surface compression generally in the range of from about 24 to about 52 MPa (about 3,500 to about 7,500 psi). (The sheet 50 is also generally heat strengthened.)

Conventionally, if the first sheet 20 and the second sheet 70 are not thermally strengthened, they tend to break upon impact and form large, sharp-edged fragments that can tear, puncture or otherwise damage the interlayer 40, causing it to fail to maintain the desired seal. If the first sheet 20 and the second sheet 70 are provided with too much surface compression, they can break like safety glass into small pieces which tend to dislodge from the frame, weakening the grip of the frame on the polymer interlayer 40, such that post-impact pressure cycling caused by storm winds can separate the polymer interlayer 40 from the spacers 60 and the frame (not shown). Thus, there is a certain range of thermal strengthening which is applied to the first sheet 20 and the second sheet 70. Too little, or too much and the window seal will fail under impact alone, or under impact followed by pressure cycling.

Currently, each sheet of the hurricane resistant window 200 requires some thermal strengthening. It would be desirable to provide a hurricane resistant window having lower manufacturing process costs, such as by avoiding unneeded thermal strengthening, while still preserving or even improving other window properties.

SUMMARY

A first aspect of the present disclosure provides at least one laminated pane which includes a first sheet, of a first transparent or translucent material, the first sheet having a first thickness, and the first transparent or translucent material having a first coefficient of thermal expansion (CTE) measured over a range of from 0 to about 300° C. The laminate pane further includes a second sheet, of a second transparent or translucent material, the second sheet having a second thickness, and the second transparent or translucent material having a second CTE. The laminated pane further includes a polymer interlayer between the first sheet and the second sheet adhered between the first sheet and the second sheet. The polymer interlayer includes a first polymer layer, of a first polymer material, the first polymer material having a first elastic modulus. The polymer interlayer further includes a second polymer layer, of a second polymer material, the second polymer material having a second elastic modulus. The first CTE is greater than the second CTE. The second thickness is in the range of from about 1 to about 0.3 mm. The second transparent or translucent material is an inorganic glass. And the first elastic modulus is in excess of about 20 times greater than the second elastic modulus, alternatively in excess of about 100 times greater than the second elastic modulus.

According to another aspect of the present disclosure, the first transparent or translucent material is an organic polymer material. Alternatively according to yet another aspect, the first transparent or translucent material is a soda lime silicate glass.

According to still another aspect, alone or in combination with any of the previous aspects, the second CTE is less than about $50 \times 10^{-7}$/° C. and greater than zero. According to still another aspect, also in combination with any of the previous aspects, the second CTE is less than about $35 \times 10^{-7}$/° C. and greater than zero.

According to still another aspect, alone or in combination with any of the previous aspects, the second transparent or translucent material is a boro-aluminosilicate glass. Alternatively, according to yet another aspect, in combination with any of the previous aspects, the second transparent or translucent material is an alkaline earth boro-aluminosilicate glass or an alkali-free boro-aluminosilicate glass.

According to still another aspect, alone or in combination with any of the previous aspects, the second thickness is in the range from about 0.85 to about 0.4 mm. Alternatively according to yet another aspect in combination with any of the previous aspects, the second thickness is in the range from about 0.8 to about 0.45 mm.

According to still another aspect, alone or in combination with any of the previous aspects, the first elastic modulus is in the range of from about 300 to about 1000 MPa when measured at an elongation rate of 10 mm per minute at 30° C. Alternatively, according to yet another aspect in combination with any of the previous aspects, the first elastic modulus is in the range of from about 400 to about 600 MPa when measured at an elongation rate of 10 mm per minute and at 30° C. Alternatively according to yet another aspect in combination with any of the previous aspects, the first elastic modulus is in the range of from about 1 to about 300 MPa when measured at an elongation rate of 10 mm per minute and at 30° C., or alternatively about 2 to about 100 MPa when measured at an elongation rate of 10 mm per minute and at 30° C.

According to still another aspect, alone or in combination with any of the previous aspects, the second elastic modulus is less than about one thirtieth, alternatively about one fortieth, alternatively about one fiftieth, or even less than about one one-hundredth of the first elastic modulus, when measured at an elongation rate of 10 mm per minute at 30° C.

According to still another aspect, alone or in combination with any of the previous aspects, the polymer interlayer further comprises a third polymer layer of the first polymer material.

Yet another aspect of the present disclosure is a window comprising a pane according to any of the above aspects.

As will be explained in more detail below, these aspects of the present disclosure, alone or in their various combinations, can provide a hurricane resistant window or a hurricane resistant pane of a hurricane resistant window, which does not require heat strengthening in the second sheet of the laminated pane and which can employ a low CTE glass sheet as the second sheet of the laminated pane without excessive distortion of the laminated pane.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and, together with the description, serve to explain the principles and operations of the disclosure.

BRIEF DESCRIPTION OF THE DRAWINGS

The following detailed description can be further understood when read in conjunction with the following drawings in which:

FIG. 1 is a cross-sectional view of a laminated pane according to aspects of the present disclosure;

FIG. 2 is a cross-sectional view of a window or IGU according to aspects of the present disclosure;

DETAILED DESCRIPTION

Figure 3:
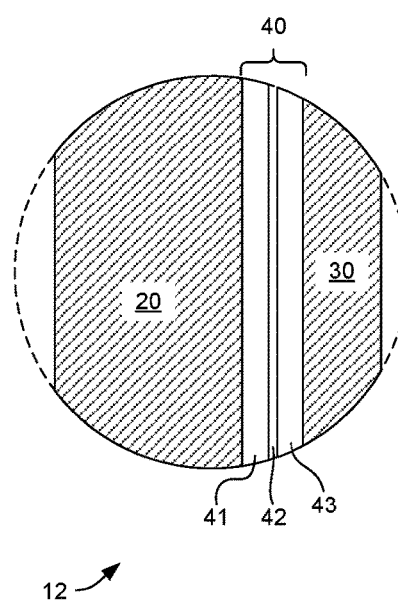
FIG. 3 and FIG. 4 are close-up cross section views of various aspects of laminated panes according to the present disclosure.
Figure 4:
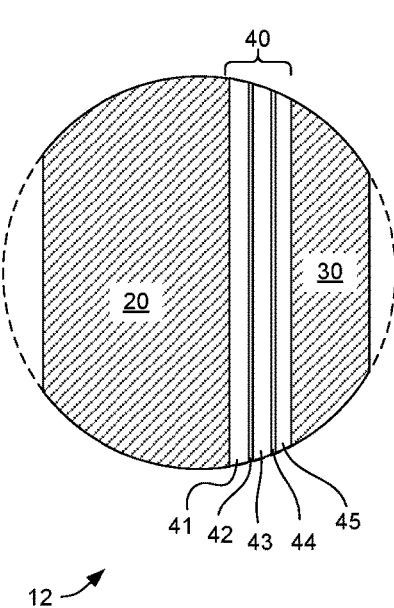
Figure 5:
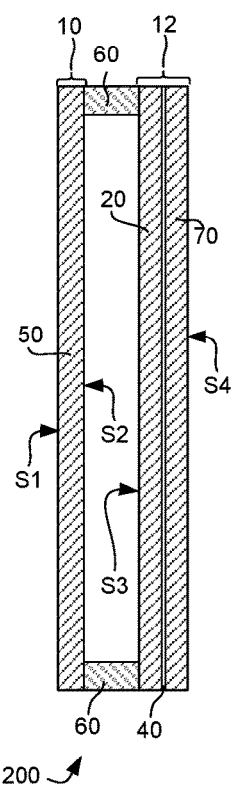
FIG. 5 (Prior Art) is a cross-sectional elevational representation of a prior art hurricane-resistant window.

Various aspects of the disclosure will now be discussed with reference to FIGS. 1-4, which illustrate aspects of laminated panes, and windows employing such panes and their components, features, or properties. The following general description is intended to provide an overview of the claimed devices, and various aspects will be more specifically discussed throughout the disclosure with reference to the non-limiting depicted aspects, these aspects generally being interchangeable with one another within the context of the disclosure.

With reference to FIG. 1, disclosed herein is a laminated pane 12 which includes a first sheet 20 of a first transparent or translucent material, the first sheet 20 having a first thickness, and the first transparent or translucent material having a first coefficient of thermal expansion measured over a range of from 0 to about 300° C. (a "CTE"). The laminate pane 12 further includes a second sheet 30, of a second transparent or translucent material, the second sheet 30 having a second thickness, and the second transparent or translucent material having a second CTE.

The laminated pane 12 further includes a polymer interlayer 40 between the first sheet 20 and the second sheet 30 an adhered between the first sheet 20 and the second sheet 30. The polymer interlayer 40, as seen in the magnified inset (or "close-up" cross-sectional view) includes a first polymer layer 41 of a first polymer material, the first polymer material having a first elastic modulus, and a second polymer layer 42, of a second polymer material, the second polymer material having a second elastic modulus.

With respect to the laminated pane 12, the first CTE (of the first sheet 20) is greater than the second CTE (of the second sheet 30), the second thickness (the thickness of the second sheet 30) is in the range of from about 1 to about 0.3 mm, the second transparent or translucent material is an inorganic glass, and the first elastic modulus (the modulus of the polymer of the first polymer layer 41) is in excess of about 20 times greater than, e.g. in excess of about 100 times greater than, the second elastic modulus (the modulus of the polymer of the second polymer layer 42).

The laminated pane 12 constitutes a hurricane resistant pane for use in a hurricane resistant window having one sheet (the second sheet 30 of the laminated pane 40) which does not require heat strengthening in order to pass impact plus pressure cycling tests required to show hurricane resistance. Without wishing to be bound by theory, this is believed to be due to the breakage patterns of the thin glass sheet (second sheet 30), which patterns do not result in damage to the polymer interlayer 40 or to the seal of the polymer interlayer 40 with the spacers 60 and window frame (not shown) under impact plus pressure cycling testing.

Accordingly, no thermal strengthening is required for second sheet 30, reducing at least one item of processing cost.

Further, the laminate pane 12 employs (and is able to employ) a low CTE glass sheet as second sheet 30 of the laminated pane without excessive distortion of the laminated pane. Again without being bound by any particular theory, this is believed to be due to the presence of second polymer layer 42 and the significantly lower elastic modulus of the second polymer layer 42, which is able to relieve stress produced during lamination when cooling down from the temperatures used to cure the polymer interlayer 40, due to the difference in CTE between the first sheet 20 and the second sheet 30. The ability to employ a low CTE glass sheet is important because high quality thin glass is commercially available in larger sheets primarily (when considering cost economies) or even exclusively (at largest sizes) in low CTE glass compositions. Further, the ability to relieve stress resulting from the different CTE values allows laminated pane 42 to be produced without excessive bow.

According to at least one aspect of this disclosure, the first transparent or translucent material (the material of the first sheet 20) is an organic polymer material. Alternatively, according to another presently preferred aspect, the first transparent or translucent material the material of the first sheet 20) is a soda lime silicate glass.

According to still another aspect, alone or in combination with any of the previous aspects, the second CTE (the CTE of the material of the second sheet 30) is less than about $50 \times 10^{-7}/°$ C. and greater than zero. According to still another aspect also combination with any of the previous aspects, the second CTE is less than about $35 \times 10^{-7}/°$ C. and greater than zero.

According to still another aspect, alone or in combination with any of the previous aspects, the second transparent or translucent material (the material of the second sheet 30) is a boro-aluminosilicate glass. Alternatively, according to yet another aspect, alone or in combination with any of the previous aspects, the second transparent or translucent material is an alkaline earth boro-aluminosilicate glass or an alkali-free boro-aluminosilicate glass. Exemplary commercial glass products include, but are not limited to, Corning® EAGLE XG® and Lotus™ NXT glasses. In some embodiments, the second sheet can be produced by float or fusion draw manufacturing processes. Soda lime glass has a CTE of approximately $90 \times 10^{-7}/°$ C. By comparison, Corning EAGLE XG glass has a CTE of approximately $31.7 \times 10^{-7}/°$ C., which is approximately ⅓ ("one-third") of the CTE of soda lime glass.

According to still another aspect of the present disclosure, in alone or combination with any of the previous aspects, the second thickness (the thickness of the second sheet 30) is in the range from about 0.85 to about 0.4 mm. Alternatively according to yet another aspect in combination with any of the previous aspects, the second thickness is in the range from about 0.8 to about 0.45 mm. According to still another aspect, the first thickness (the thickness of the first sheet 20) may be in the range of from about 2 to about 20 mm, or alternatively from about 3 to about 12 mm, or alternatively from about 3 to about 6 mm.

According to still another aspect, in combination with any of the previous aspects, the first elastic modulus (the modulus of the polymer of the first polymer layer 41) is in the range of from about 300 to about 1000 MPa when measured at an elongation rate of 10 mm per minute at 30° C. Alternatively, according to yet another aspect in combination with any of the previous aspects, the first elastic modulus is in the range of from about 400 to about 600 MPa when measured at an elongation rate of 10 mm per minute and at 30° C. According to still another aspect, in combination with any of the previous aspects, the first elastic modulus (the modulus of the polymer of the first polymer layer 41) is in the range of from about 1 to about 300 MPa when measured at an elongation rate of 10 mm per minute at 30° C. Alternatively, according to yet another aspect in combination with any of the previous aspects, the first elastic modulus is in the range of from about 2 to about 100 MPa when measured at an elongation rate of 10 mm per minute and at 30° C. The first polymer may be selected from interlayer polymers typically used for hurricane resistant or intrusion-resistant windows, such as, for example, Sentry-Glas® available from DuPont or from various distributors.

According to still another aspect, in combination with any of the previous aspects, the second elastic modulus (the modulus of the polymer of the second polymer layer 42) is less than about one thirtieth, alternatively about one fortieth, alternatively about one fiftieth, or alternatively even about one one-hundredth of the first elastic modulus, when measured at an elongation rate of 10 mm per minute at 30° C. The second polymer may be selected from various low-elastic-modulus polymers, such as, for example, thermoplastic urethanes.

As another aspect of the present disclosure, FIG. 2 shows a cross section of a window 100 having a laminated pane 12 as described with respect to FIG. 1.

According to still another aspect, as shown in the close-up cross section of FIG. 3, the polymer interlayer 40 can further include a third polymer layer 43 of the first polymer material, particularly since it is common to use multiple layers of high-modulus polymer in order to improve the damage resistance of the polymer interlayer 40. According to still another aspect, as shown in the close-up cross section of FIG. 4, the polymer interlayer 40 can further include a fourth polymer layer 44 of the second polymer material, and a fifth polymer layer of the first polymer material, there providing two low-modulus layers (the second and fourth layers) to provide stress relief and prevent excess bow. Of course, the window 100 of FIG. 2 may also use any of the polymer interlayers 40 shown in FIGS. 1, 3, and 4 or other combinations not shown.

In a first example, a laminate was produced according to at least one embodiment of the present application. The laminate had a height of about 989 mm and a width of about 1256 mm. The laminate had a first sheet made up of soda lime glass having a thickness of about 2.1 mm and a second sheet of Corning EAGLE XG glass having a thickness of about 0.7 mm. The two glass sheets had a polymer layer between them made up of multi-layer polyvinyl butyrate (PVB) having a thickness of about 0.81 mm. The polymer layer was made up of two outer layers of PVB having a higher elastic modulus than the inner core layer of PVB. The two outer layers of PVB both had a thickness of about 0.34 mm and the inner layer of PVB has a thickness of about 0.13 mm for a total polymer thickness of about 0.81 mm. The higher elastic modulus PVB was at least about 20 times greater than the lower elastic modulus PVB.

A standard laminate was produced for comparison. The standard laminate had a height of about 989 mm and a width of about 1256 mm. The laminate had a first sheet made up of soda lime glass having a thickness of about 2.1 mm and a second sheet of Corning EAGLE XG glass having a thickness of about 0.7 mm. The two glass sheets had a polymer layer between them made up of standard single layer polyvinyl butyrate (PVB) having a thickness of about 0.76 mm. The polymer layer was made up of PVB having an elastic modulus at least about 20 times greater than the lower elastic modulus PVB. It is noted that the minor difference in thickness between the polymer layers of the two laminates would not be expected to produce a difference in resulting bow.

Both samples were tested for bow according to EN 12150 as follows: the laminate was placed in a vertical position and supported on its longer side by two load bearing blocks at the quarter points. The deformation was then measured along the diagonals as the maximum distance between a straight metal ruler, or a stretched wire, and the concave surface of the glass. The value for the bow is then expressed as absolute value of the deformation, in mm.

The standard laminate produced a bow of approximately 4.52 mm (measured as max-min across diagonal). The laminate according to an embodiment of the present application produced a bow of approximately 2.78 mm (measured as max-min across diagonal). This translates to about a 38% reduction in bow for the present laminates.

In another example, a laminate was produced according to a further embodiment of the present application. The laminate had a height of about 3 feet and a width of about 5 feet. The laminate had a first sheet made up of soda lime glass having a thickness of about 6 mm and a second sheet of Corning EAGLE XG glass having a thickness of about 0.7 mm. The two glass sheets had a polymer layer between them made up of multi-layer polyvinyl butyrate (PVB) having a thickness of about 0.81 mm. The polymer layer was made up of two outer layers of PVB having a higher elastic modulus than the inner core layer of PVB. The two outer layers of PVB both had a thickness of about 0.34 mm and the inner layer of PVB has a thickness of about 0.13 mm for a total polymer thickness of about 0.81 mm. The higher elastic modulus PVB was at least about 20 times greater than the lower elastic modulus PVB.

A standard laminate was produced for comparison. The standard laminate had a height of about 3 feet and a width of about 5 feet. The first laminate had a first sheet made up of soda lime glass having a thickness of about 6 mm and a second sheet of Corning EAGLE XG glass having a thickness of about 0.7 mm. The two glass sheets had a polymer layer between them made up of standard single layer polyvinyl butyrate (PVB) having a thickness of about 0.76 mm. The polymer layer was made up of PVB having an elastic modulus at least about 20 times greater than the lower elastic modulus PVB. It is noted that the minor difference in thickness between the polymer layers of the two laminates would not be expected to produce a difference in resulting bow.

Both samples were tested for bow according to EN 12150 as follows: the laminate was placed in a vertical position and supported on its longer side by two load bearing blocks at the quarter points. The deformation was then measured along the diagonals as the maximum distance between a straight metal ruler, or a stretched wire, and the concave surface of the glass. The value for the bow is then expressed as absolute value of the deformation, in mm.

The standard laminate produced a bow of approximately 5.01 mm (measured as max-min across diagonal). The laminate according to an embodiment of the present application produced a bow of approximately 2.88 mm (measured as max-min across diagonal). This translates to about a 43% reduction in bow for the present laminates.

It will be appreciated that the various disclosed embodiments can involve particular features, elements or steps that are described in connection with that particular embodiment. It will also be appreciated that a particular feature, element or step, although described in relation to one particular embodiment, can be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a component" includes examples having one such "component" or two or more such "components" unless the context clearly indicates otherwise. Similarly, a "plurality" or an "array" is intended to denote two or more, such that an "array of components" or a "plurality of components" denotes two or more such components.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 100 nm" and "a dimension less than about 100 nm" both include embodiments of "a dimension less than about 100 nm" as well as "a dimension less than 100 nm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments can be disclosed using the transitional phrase "comprising," it is to be understood that alternative embodiments, including those that can be described using the transitional phrases "consisting" or "consisting essentially of," are implied. Thus, for example, implied alternative embodiments to a device comprising A+B+C include embodiments where a device consists of A+B+C, and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure can occur to persons skilled in the art, the disclosure should be construed to include everything within the scope of the appended claims and their equivalents.

What is claimed is:

1. An insulated glass unit comprising:
   an outer pane providing an outer surface and an interior surface of the insulated glass unit;
   an inner laminated pane comprising:
   a first sheet of a first transparent or translucent material of soda lime silicate glass, the first sheet (i) providing another interior surface of the insulated glass unit, (ii) having a first thickness, and (iii) comprising surface compression from thermal tempering, wherein the first transparent or translucent material exhibits a first coefficient of thermal expansion ($CTE_1$) measured over a range of from 0 to about 300° C.;

a second sheet of a second transparent or translucent material of boro-aluminosilicate glass, the second sheet (i) providing another outer surface of the insulated glass unit and (ii) having a second thickness, wherein (i) the second transparent or translucent material exhibits a second coefficient of thermal expansion ($CTE_2$) and (ii) the second sheet does not include surface compression from thermal tempering; and a polymer interlayer between the first sheet and the second sheet adhered between the first sheet and the second sheet, the polymer interlayer comprising:

a first polymer layer of a first polymer material, the first polymer material having a first elastic modulus, and a second polymer layer of a second polymer material, the second polymer material having a second elastic modulus;

wherein the first polymer layer is positioned adjacent to the first sheet and the second polymer layer is positioned adjacent to the second sheet;

wherein $CTE_1$ is greater than $CTE_2$, the first thickness is in the range from about 2 mm to about 20 mm; the second thickness is in the range from about 1 to about 0.3 mm, and the first elastic modulus is more than about 20 times greater than the second elastic modulus;

spacers separating the outer pane from the inner laminated pane; and wherein the inner laminated pane has a normalized diagonal bow percentage of no greater than 0.174% when measured in accordance with EN 12150 in as-laminated condition.

2. The insulated glass unit according to claim 1, wherein $CTE_2$ is less than about $50 \times 10^{-7}$/° C. and greater than zero.

3. The insulated glass unit according to claim 1, wherein $CTE_2$ is less than about $35 \times 10^{-7}$/° C. and greater than zero.

4. The insulated glass unit according to claim 1, wherein the second transparent or translucent material is an alkaline earth boro-aluminosilicate glass or an alkali-free boro-aluminosilicate glass.

5. The insulated glass unit according to claim 1, wherein the second thickness is in the range from about 0.85 to about 0.4 mm.

6. The insulated glass unit according to claim 1, wherein the second thickness is in the range from about 0.8 to about 0.45 mm.

7. The insulated glass unit according to claim 1, wherein the first elastic modulus is in the range of from about 300 to about 1000 MPa when measured at an elongation rate of 10 mm per minute and at 30° C.

8. The insulated glass unit according to claim 1, wherein the first elastic modulus is in the range of from about 400 to about 600 MPa when measured at an elongation rate of 10 mm per minute and at 30° C.

9. The insulated glass unit according to claim 1, wherein the second elastic modulus is less than one thirtieth of the first elastic modulus or less when measured at an elongation rate of 10 mm per minute and at 30° C.

10. The insulated glass unit according to claim 1, wherein the second elastic modulus is less than one fortieth of the first elastic modulus or less when measured at an elongation rate of 10 mm per minute and at 30° C.

11. The insulated glass unit according to claim 1, wherein the second elastic modulus is less than about one one-hundredth of the first elastic modulus or less when measured at an elongation rate of 10 mm per minute and at 30° C.

12. The insulated glass unit according to claim 1, wherein the first sheet has a thickness of from 2.1 mm to about 6 mm.

13. The insulated glass unit of claim 1, wherein
the first polymer layer directly contacts the first sheet, and
the second polymer layer directly contacts the second sheet.

14. An insulated glass unit comprising:
an outer pane providing an outer surface and an interior surface of the insulated glass unit; and
an inner laminated pane comprising:
a first sheet of soda lime glass, the first sheet (i) providing another interior surface of the insulated glass unit and (ii) comprising a thickness within a range of from 2.1 mm to 20 mm;
a second sheet of alkaline earth boro-aluminosilicate glass, the second sheet comprising a thickness within a range of from 0.3 to 1 mm; and
a three-layer polymer interlayer disposed between and directly contacting the first sheet and the second sheet, each of the three layers of the three-layer polymer interlayer comprising (i) a shared composition, (ii) a thickness, the thickness of a middle layer of the three-layer polymer interlayer being less than the thickness of outer layers of the three-layer polymer interlayer, and (iii) an elastic modulus, the elastic moduli of the outer layers being at least twenty times greater than the elastic modulus of the inner layer,
wherein the inner laminated pane has a normalized diagonal bow percentage of no greater than 0.174% when measured in accordance with EN 12150 in as-laminated condition.

15. The insulated glass unit of claim 14, wherein
the thickness of the first sheet of soda glass is within a range of from 2.1 mm to less than 3 mm.

16. The insulated glass unit of claim 14, wherein the second sheet is not thermally strengthened.

* * * * *